(12) United States Patent
LaForge et al.

(10) Patent No.: US 11,673,621 B2
(45) Date of Patent: Jun. 13, 2023

(54) SYSTEMS AND METHODS OF BICYCLE SUSPENSION

(71) Applicant: Cane Creek Cycling Components, Inc., Fletcher, NC (US)

(72) Inventors: Jeff LaForge, Asheville, NC (US); James Gray Morrison, Asheville, NC (US)

(73) Assignee: Cane Creek Cycling Components, Inc., Fletcher, NC (US)

( * ) Notice: Subject to any disclaimer, the term of this patent is extended or adjusted under 35 U.S.C. 154(b) by 576 days.

(21) Appl. No.: 16/831,072

(22) Filed: Mar. 26, 2020

(65) Prior Publication Data

US 2021/0300492 A1    Sep. 30, 2021

(51) Int. Cl.
*B62J 1/06* (2006.01)
*B62K 25/04* (2006.01)
*F16F 1/36* (2006.01)
*F16F 15/08* (2006.01)

(52) U.S. Cl.
CPC .............. *B62J 1/065* (2013.01); *B62K 25/04* (2013.01); *F16F 1/36* (2013.01); *F16F 15/08* (2013.01)

(58) Field of Classification Search
CPC ........................................................ B62J 1/065
See application file for complete search history.

(56) References Cited

U.S. PATENT DOCUMENTS

| | | | | |
|---|---|---|---|---|
| 2,949,153 A * | 8/1960 | Hickman | ............... | B60N 2/502 248/575 |
| 5,489,139 A * | 2/1996 | McFarland | ................ | B62J 1/04 280/283 |
| 5,702,093 A * | 12/1997 | Liao | .......................... | B62J 1/065 267/132 |
| 5,833,255 A * | 11/1998 | Sarder | ....................... | B62J 1/065 280/220 |
| 5,915,675 A * | 6/1999 | Chen | ......................... | B62J 1/065 267/132 |
| 2013/0056952 A1 * | 3/2013 | Barkley | ................... | B62J 1/065 280/283 |

FOREIGN PATENT DOCUMENTS

| | | |
|---|---|---|
| FR | 924001 A | 7/1947 |
| FR | 2790438 A1 | 9/2000 |
| JP | 2007118914 A | 5/2007 |
| NZ | 242931 A | 9/1994 |
| WO | WO94/18055 A1 | 8/1994 |

(Continued)

OTHER PUBLICATIONS

International Search Report for PCT Application No. PCT/US2021/015464 dated Apr. 20, 2021; 4 pages.

*Primary Examiner* — Minnah L Seoh
*Assistant Examiner* — Ryan Edward Hardy
(74) *Attorney, Agent, or Firm* — Dority & Manning, P.A.

(57) ABSTRACT

A parallelogram suspension in a bicycle, the parallelogram suspension comprising a first swing arm rotatably coupled to a seat post at a first end of the first swing arm; a second swing arm rotatably coupled to the seat post at a first end of the second swing arm; a linkage rotatably coupled between a second end of the first swing arm and a second end of the second swing arm; a deformable support disposed in a volume defined between the first swing arm, the second swing arm, and the linkage; and a release configured to selectively open the volume to release the deformable support.

17 Claims, 6 Drawing Sheets

(56) References Cited

FOREIGN PATENT DOCUMENTS

| WO | WO-9638335 A1 | * | 12/1996 | ................ | B62J 1/04 |
| WO | WO-9962756 A2 | * | 12/1999 | ................ | B62J 1/04 |
| WO | WO-0053484 A1 | * | 9/2000 | ................ | B62J 1/04 |
| WO | WO-2014016633 A1 | * | 1/2014 | .............. | B62J 1/065 |

* cited by examiner

SYSTEMS AND METHODS OF BICYCLE SUSPENSION

FIELD

The present disclosure relates to systems and methods associated with bicycle suspensions, and more particularly to suspensions for use with bicycle seat posts.

BACKGROUND

Bicycles, particularly mountain bicycles, are often used on rough terrain where they subject the rider to vibrations caused by bumps and impacts from the ground surface. Full suspension systems that permit relative travel of the front and rear wheels with respect to the bicycle frame may dampen the ride, transferring fewer vibrations to the rider. However, full suspension systems must typically be integrated into the bicycle frame at the factory (particularly rear wheel suspension systems), with limited opportunity for significant upgrades or subsequent rider adjustments. While it may be possible to adjust (or tune) the suspension settings for an individual rider, suspension systems have fixed suspension travel distances which limit the range of dampening effects. Moreover, many bicycle designs lack full suspension systems—instead using a fixed rear wheel with a suspended front fork or a fixed real wheel and a fixed front fork, leading to greater vibrational transfer to the rider. Riders seeking greater shock absorption must often turn elsewhere for aftermarket suspension solutions.

Seat post suspension systems typically involve the use of a suspended seat post that permits relative travel between the bicycle seat and the bicycle frame. Because seat posts can be readily swapped and installed aftermarket, it is not uncommon for riders to favor upgrades and adjustments to their seat post in search for a smoother ride.

However, seat post suspension systems typically come with limited suspension adjustability. More specifically, seat post suspensions typically utilize either nonadjustable suspension elements, such as single-setting pistons set to a fixed pressure, or complex hardware which requires professional adjustment and extensive time and tooling to adjust. The rider is thus stuck with the seat post suspension settings out-of-the-box with limited or no tunability.

Accordingly, an adjustable suspension other than for the rear and front wheels which permits the rider to quickly select between two or more adjustable suspension settings is desired.

BRIEF DESCRIPTION

Aspects and advantages of the invention will be set forth in part in the following description, or may be obvious from the description, or may be learned through practice of the invention.

In accordance with one aspect, the present disclosure is directed to a parallelogram suspension in a bicycle. The parallelogram suspension includes a first swing arm rotatably coupled to a seat post at a first end of the first swing arm and a second swing arm rotatably coupled to the seat post at a first end of the second swing arm. The parallelogram suspension further includes a linkage rotatably coupled between a second end of the first swing arm and a second end of the second swing arm. A deformable support is disposed in a volume defined between the first swing arm, the second swing arm, and the linkage. The parallelogram suspension further includes a release configured to selectively open the volume to release the deformable support from the volume.

In accordance with another aspect, the present disclosure is directed to a parallelogram suspension in a bicycle, the parallelogram suspension including a deformable support configured to absorb shock. The deformable support is selected from a plurality of deformable supports and configured to be changed without the use of separate tooling.

In accordance with another aspect, the present disclosure is directed to a method of adjusting suspension stiffness for a bicycle, the method including a step of moving a release of a parallelogram suspension from a closed configuration to an open configuration. The method further includes rotating at least one of first and second swing arms of the parallelogram suspension in a first direction to increase an effective dimension of a volume defined in part by the first and second swing arms. The method further includes removing a deformable support from the volume.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
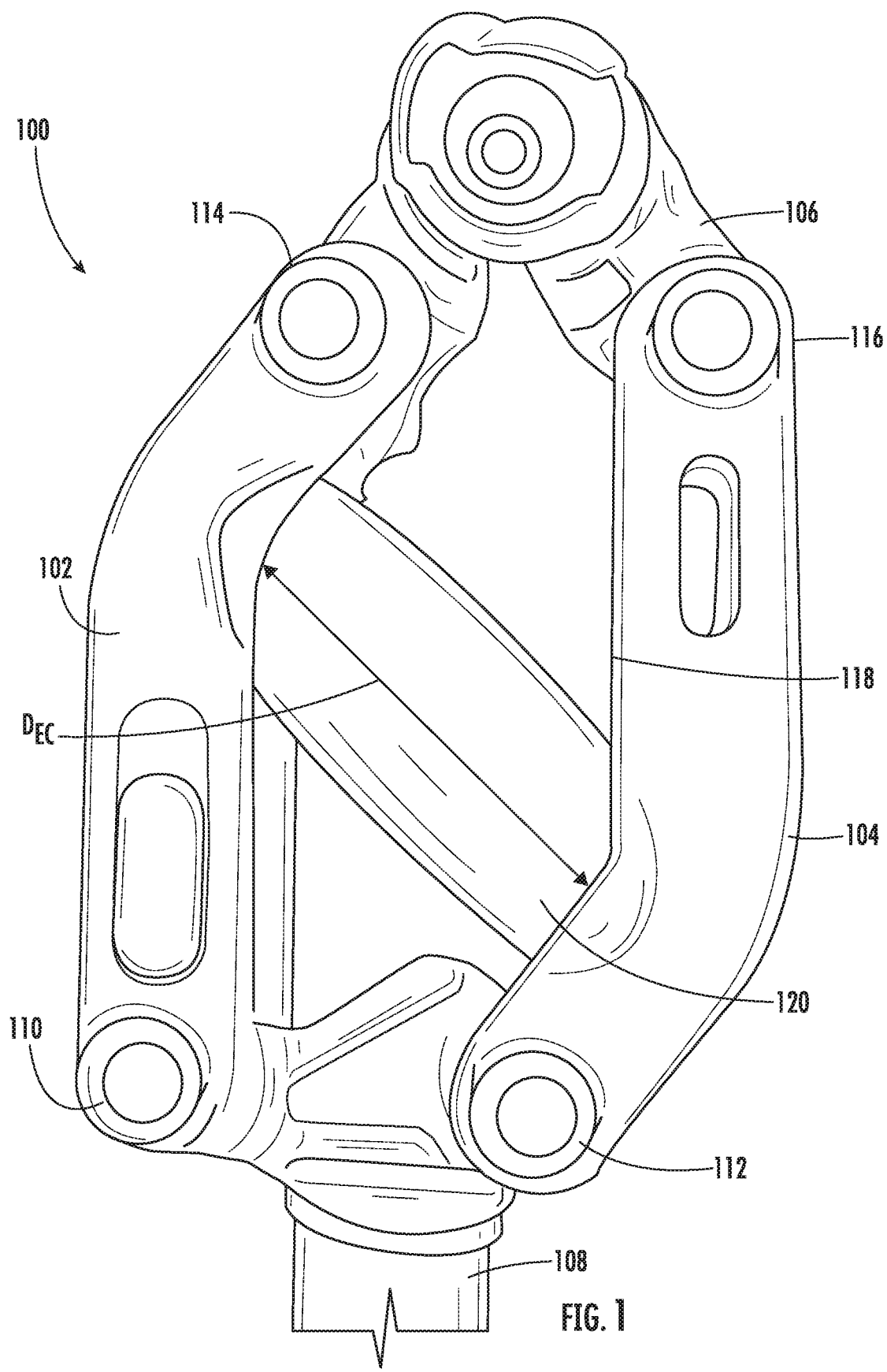
FIG. 1 includes a side elevation view of a bicycle suspension in a closed configuration in accordance with an embodiment of the present disclosure.

Reference now will be made in detail to embodiments of the invention, one or more examples of which are illustrated in the drawings. Repeat use of reference characters in the present specification and drawings is intended to represent the same or analogous features or elements of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and do not necessarily signify sequence or importance of the individual components. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the Figures, the present disclosure is generally directed to bicycle suspension systems. In an embodiment, the present disclosure is directed to bicycle suspension systems for use with bicycle seat posts. More particularly, the bicycle suspension system can be utilized in a bicycle seat post to absorb shock transmitted from the bicycle to the rider. In an embodiment, the bicycle suspension can include a parallelogram suspension. Referring to FIG. 1, a parallelogram suspension 100 in accordance with an exemplary embodiment can include a first swing arm 102, a second swing arm 104, and a linkage 106. The first and second swing arms 102 and 104 can be coupled to a seat post 108 at first ends 110 and 112 of the first and second swing arms 102 and 104, respectively. The seat post 108 can include an upper end of a seat post stem and may further include a linkage-type component to which the first and second swing arms 102 and 104 are attached. The first and second swing arms 102 and 104 can be coupled to the linkage 106 at second ends 114 and 116 of the first and second swing arms 102 and 104, respectively. In an embodiment, the first and second swing arms 102 and 104, the linkage 106, and the seat post 108 can together define the parallelogram suspension 100.

Shock forces transmitted through the parallelogram suspension can cause one or both of the first and second swing arms 102 and 104 to rotate, displacing the seat post 108 relative to the linkage 106. The resulting displacement results in mitigation of the shock force being transmitted to the linkage 106, which connects to a seat upon which the rider sits. In this regard, shock can be absorbed by angular deflection of the parallelogram suspension 100.

The parallelogram suspension can define a volume 118 disposed at least partially between the first swing arm 102, the second swing arm 104, the linkage 106, and the seat post 108. The volume 118 can be configured to receive a deformable support 120 having a body configured to deform under load.

In an embodiment, the deformable support 120 can include a hydraulic dampening system, a spring dampening system, and/or a deformable body. In a particular embodiment, the deformable support 120 can include a generally homogenous body defining an effective spring rate suitable to bias at least one of the first swing arm 102, the second swing arm 104, the linkage 106, and the seat post 108 to an extended position. As used herein, the "extended position" refers to a condition whereby the parallelogram suspension is ready to absorb shock transmitted through the seat post 108 (e.g., in the state illustrated in FIG. 1). In the "extended position" the parallelogram suspension can exhibit maximum shock absorbing characteristics. As the parallelogram suspension deforms (i.e., as it absorbs shock), the parallelogram suspension 100 can have reduced shock absorbing characteristics. That is, the available shock absorption distance of travel can decrease as a direct result of travel already exhibited by the parallelogram suspension 100. For instance, by way of nonlimiting example, the parallelogram suspension 100 may be configured to travel a maximum of 2 inches. Upon travelling 0.75 inches, the remaining shock absorbing characteristic of the parallelogram suspension 100 can correlate with a travel of approximately 1.25 inches. In this regard, the "extended position" can refer to the initial, maximum travel which the parallelogram suspension 100 can move. In this exemplary case—2 inches. In an embodiment, the deformable support 120 can have an effective spring rate sufficient to maintain the parallelogram suspension 100 at or near the extended position when the rider is on the seat, when the rider is off the seat, or both.

In an embodiment, the deformable support 120 can have a generally linear spring rate. That is, the spring rate can remain relatively unchanged as the parallelogram suspension travels through its shock absorbing range. In another embodiment, the deformable support 120 can have a progressive spring rate. That is, for example, the spring rate of the deformable support 120 can increase as the parallelogram suspension travels from the extended position to a maximum travel position. The progressive spring rate may be linearly progressive or variably progressive.

In certain instances, the deformable support 120 can be formed from an elastomer. Exemplary elastomers include natural rubber, neoprene rubber, buna-s rubber, buna-n rubber, synthetic polyisoprene, polybutadiene, chloroprene, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, elastin, polysufile rubber, elastolefin, thermoplastic polyolefinelastomers, thermoplastic vulcanizates, thermoplastic polyurethanes, thermoplastic copolymers, and/or thermoplastic polyamides. It should be understood that the above material listing is exemplary only and that the deformable support 120 can include any other material or composites of materials suitable for providing shock absorbing characteristics.

The deformable support 120 can have a Shore A hardness in a range of 20 and 100, such as in a range of 25 and 80, such as in a range of 30 and 75, such as in a range of 35 and 70, such as in a range of 40 and 65. In an embodiment, the deformable support 120 can define a multi-modal Shore A hardness characterized by different portions of the deformable support 120 having different Shore A hardnesses. By way of example, the deformable support 120 can include a multi-layer stratum having, for example, an outer layer and an inner layer each having different Shore A hardnesses. Alternatively, and by way of example, the deformable support 120 can include multiple exposed (outer) portions each having different Shore A hardnesses. For instance, a radially inner core (exposed to an external environment) may exhibit a first Shore A hardness and a radially outer component (exposed to an external environment) may exhibit a second Shore A hardness different from the first Shore A hardness.

Figure 2:
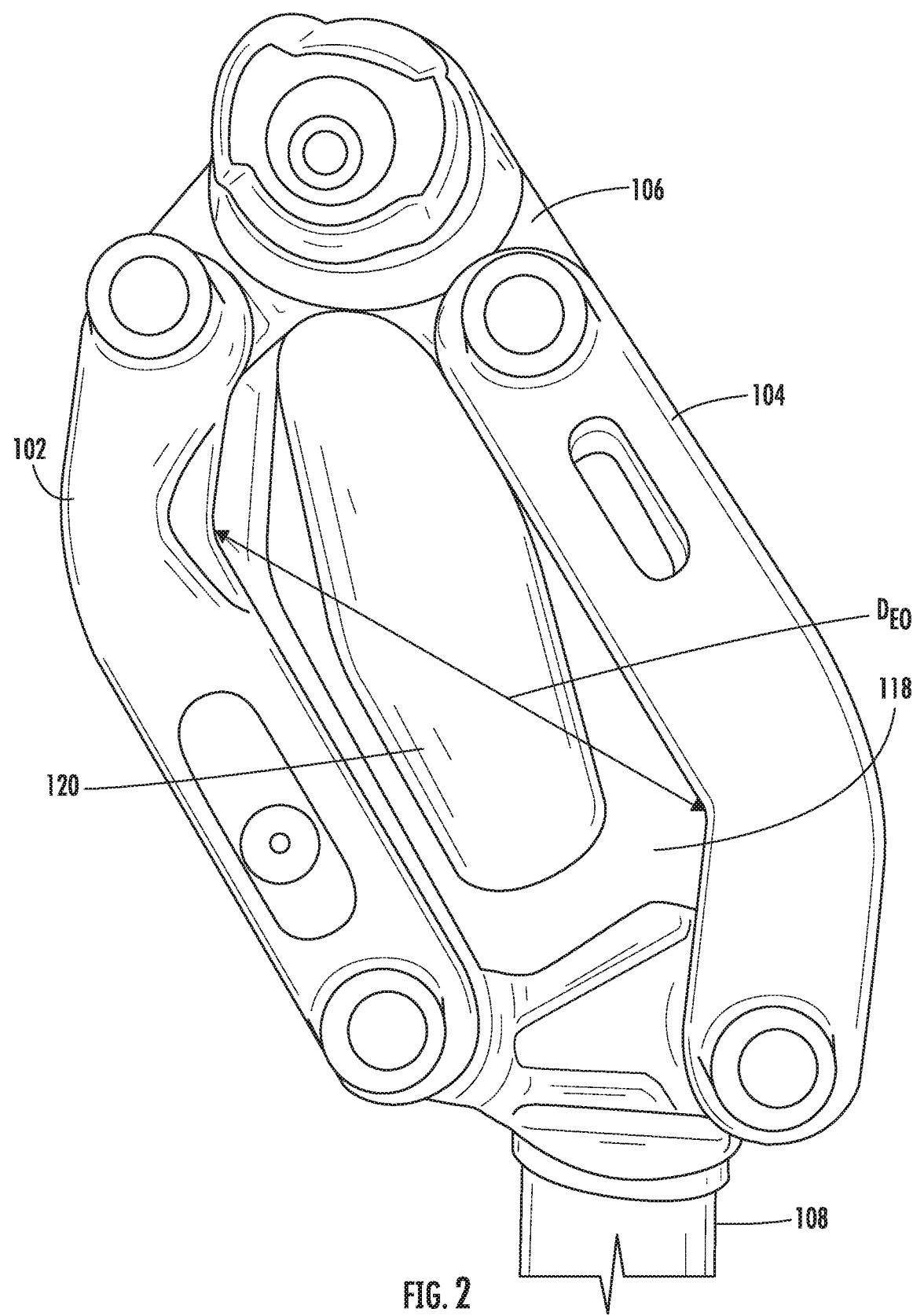
FIG. 2 includes a side elevation view of a bicycle suspension in an open configuration in accordance with an embodiment of the present disclosure.

The deformable support 120 may be retained within the volume 118 when the volume 118 is in a closed configuration, as illustrated in FIG. 1. The deformable support 120 may be removable from the volume 118 when the volume 118 is in an open configuration, as illustrated in FIG. 2. Referring to FIG. 2, the volume 118 can be moved from the closed configuration to the open configuration by rotating at least one of the first and second swing arms 102 and 104 with respect to the seat post 108. The linkage 106 may connect the first and second swing arms 102 and 104 such that the first and second swing arms 102 and 104 rotate in unison.

In the open configuration, an effective dimension, $D_{EO}$, of the volume 118, as measured by a distance through which the deformable support 120 can be traversed, may be less than an effective dimension, $D_{EC}$, of the volume 118 in the closed configuration (FIG. 1). While $D_{EO}$ may be greater than an effective dimension of the deformable support 120 (i.e., allowing for removal of the deformable support 120 from the volume 118), the effective dimension, $D_{EC}$, of the volume 118 in the closed configuration can be less than the effective dimension of the deformable support 120 such that the deformable support 120 is retained within the volume 118. In such a manner, the deformable support 120 may be selectively retained within the volume 118. By way of example, $D_{EO}$ can be at least 1.01 $D_{EC}$, such as at least 1.02 $D_{EC}$, such as at least 1.05 $D_{EC}$, such as at least 1.1 $D_{EC}$, such as at least 1.25 $D_{EC}$. As the effective dimension of the volume 118 changes, the ability to remove the deformable support 120 from the volume 118 can change. That is, the effective dimension can exceed a dimension of the deformable support 120, thereby permitting the deformable support 120 to pass from the volume 118. In this regard, a rider can remove the deformable support 120 from the volume 118 and adjust a characteristic of the parallelogram suspension 100.

In an embodiment, the deformable support 120 can be swappable between a plurality of deformable supports 120. Each of the deformable supports 120 can have one or more different characteristics as compared to one another. For example, a first deformable support can define a first spring rate and a second deformable support can define a second spring rate different than the first spring rate. By way of another example, the first deformable support may include a first elastomer and the second deformable support may include a second elastomer different from the first elastomer. In another example, the first deformable support can have a first size and the second deformable support can have a second size different than the first size. In yet another example, the first deformable support may include a spring and the second deformable support may be devoid of springs (e.g., the second deformable support may include a deformable body or a hydraulic). In a further example, the first deformable support may include a hydraulic system and the second deformable support may be devoid of hydraulic systems. The rider may select the proper deformable support 120 from the plurality of deformable supports in response to their particular riding style, road or trail conditions, to permit another rider to utilize their bicycle and/or any other reason recognized by one of ordinary skill in the art. By adjusting the deformable support 120 or through selecting an appropriate deformable support 120, the rider can customize their riding experience for their particular needs and conditions.

Figure 3:
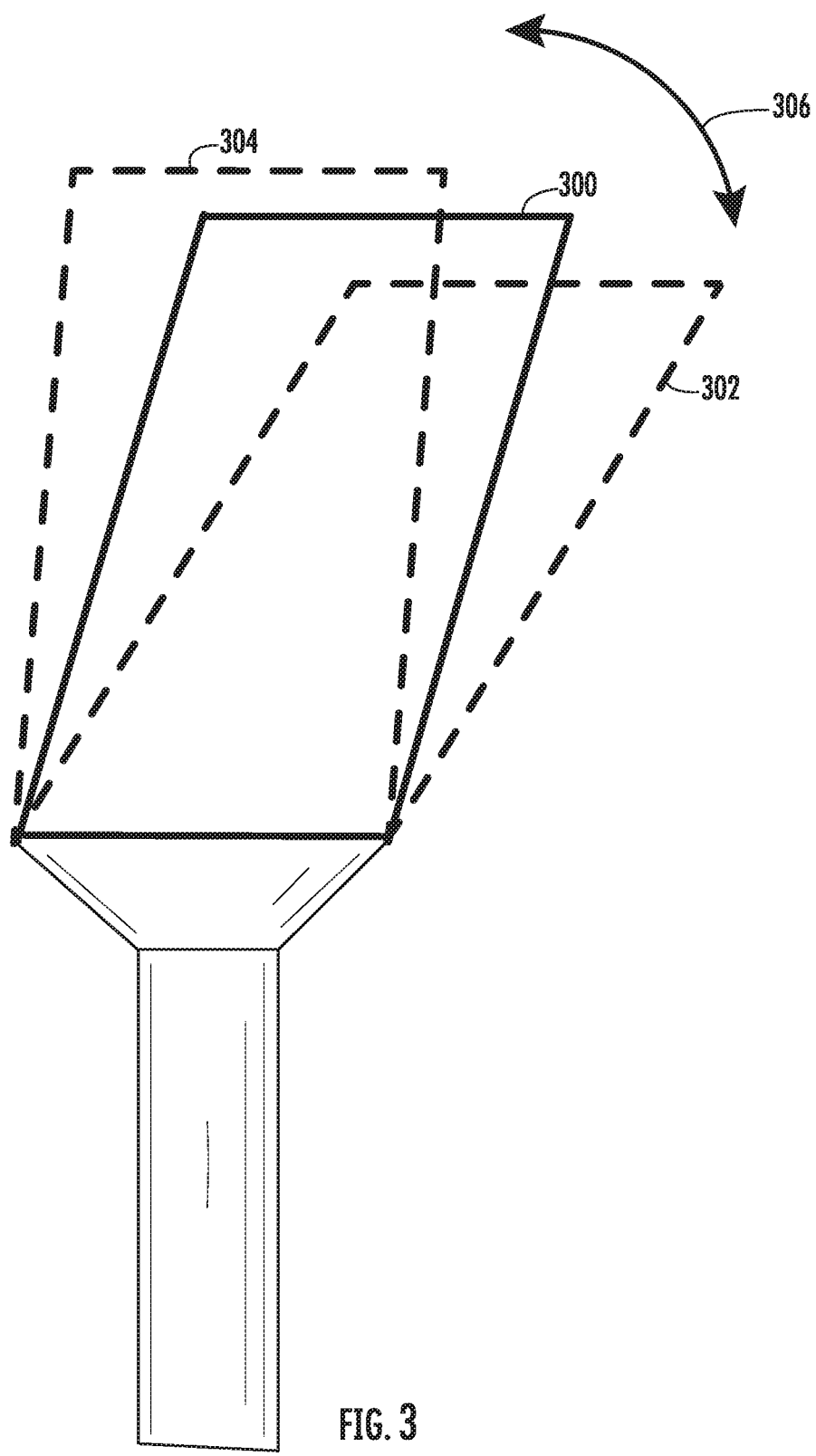
FIG. 3 includes a schematic view of a bicycle suspension in accordance with an embodiment of the present disclosure.

Referring to FIG. 3, the parallelogram suspension can define an extended position 300, a maximum travel position 302, and an open position 304 in which the parallelogram suspension is in an open configuration and whereby the deformable support 120 can be removed from the volume 118 (FIGS. 1 and 2). As illustrated in FIG. 3, the extended position 300 can be disposed angularly between the maximum travel position 302 and the open position 304. In an embodiment, the parallelogram suspension can travel from the extended position 300 to the maximum travel position 302 by rotating in a first direction and from the extended position 300 to the open position 304 by rotating in a second direction opposite the first direction. The first and second directions are illustrated in FIG. 3 by double arrow 306. In an embodiment, the parallelogram suspension can be configured to rotate in a first direction when acting in a shock absorbing capacity and rotate in a second direction when being opened. The first and second directions can be opposite one another, as shown in FIG. 3. As described with respect to FIGS. 1 and 2, the effective dimension, DE, can increase as the parallelogram suspension travels from the maximum travel position 302 to the open position 304 or from the extended position 300 to the open position 304.

Figure 4:
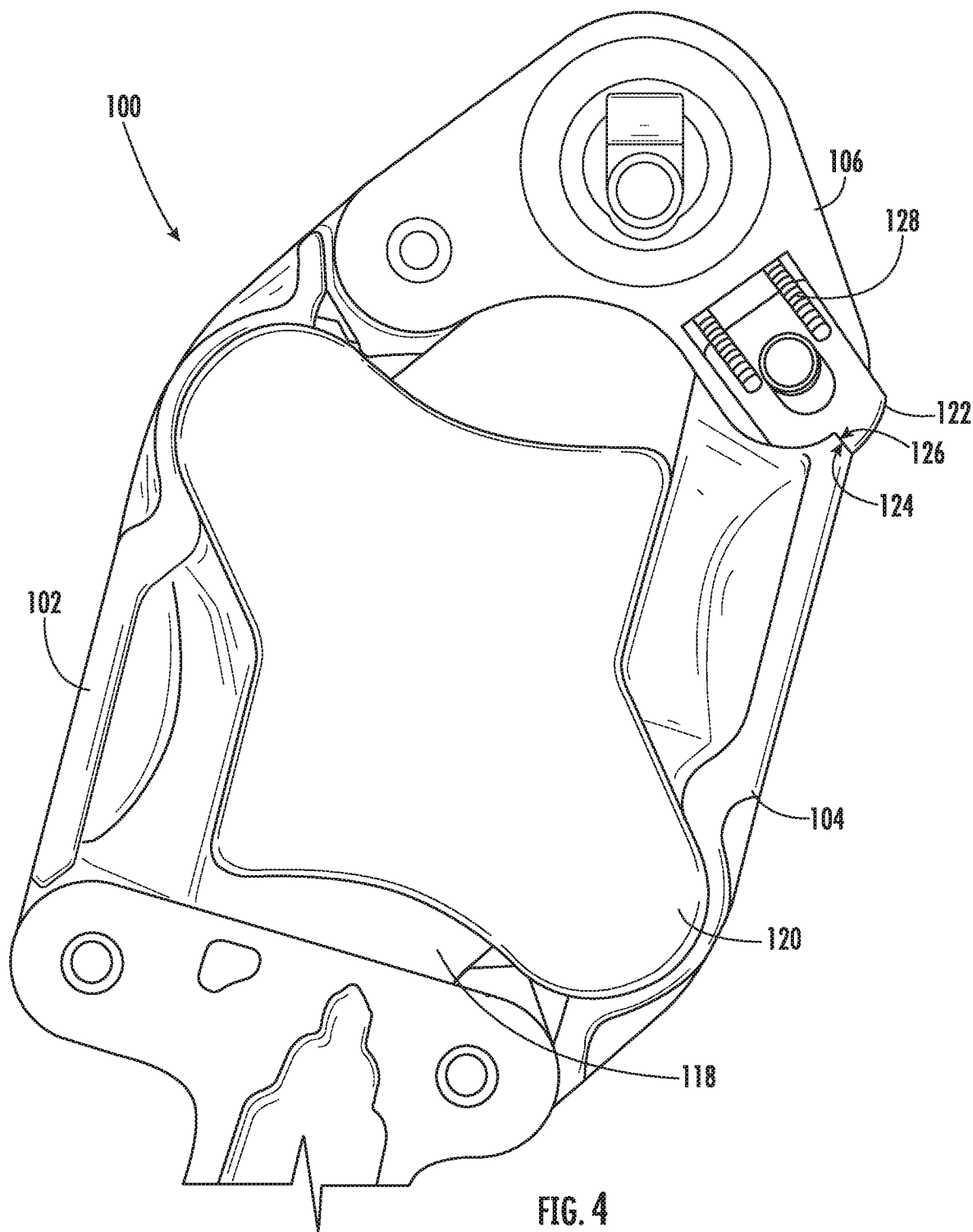
FIG. 4 includes a cross-sectional view of a bicycle suspension in a closed configuration in accordance with an embodiment of the present disclosure.

The parallelogram suspension can be configured to remain in a closed configuration (FIG. 1) until it is selectively opened by a rider (FIG. 2). FIG. 4 illustrates a cross-sectional view of a parallelogram suspension 100 in accordance with an embodiment described herein. The parallelogram suspension 100 includes a release 122 which selectively opens the volume 118 to release the deformable support 120 therefrom. When unbiased, the release 122 can maintain the parallelogram suspension in the closed configuration. When biased, the release can clear one or more elements of the parallelogram suspension 100, thereby permitting the parallelogram suspension 100 to move to the open configuration.

The release 122 of FIG. 4 is shown with a spring-loaded biasing element 128. In this regard, the release 122 can be self-biased to the closed configuration whereby the parallelogram suspension 100 automatically remains in the closed configuration once the release 122 catches. The release 122 can form an interference with one or more surfaces or components of the parallelogram suspension 100 to prevent the parallelogram suspension from moving between the closed configuration and the open configuration. By way of non-limiting example, the release 122 may be slidably disposed within the linkage 106. A surface 124 of the release 122 may interact with the second swing arm 104 to prevent the second swing arm 104 from moving to the open configuration. When the release 122 is depressed relative to the linkage 106, i.e., the release 122 is selectively moved to an unlocked configuration, the surface 124 may clear a corresponding surface 126 of the second swing arm 104 to permit the second swing arm 104 to rotate to the open configuration. Once the release 122 is depressed such that the surface 126 of the second swing arm 104 can clear the surface 124 of the release 122, the release 122 may not operatively interact with another feature to lock the parallelogram suspension 100 to lock the parallelogram suspension 100. That is, the release 122 may remain in the unlocked configuration until such time as the parallelogram suspension 100 is moved to the closed configuration. For example, the release 122 may remain depressed while the parallelogram suspension 100 is open. That is, for example, the second swing arm 104 can be shaped such that the release 122 passes thereover while remaining in the depressed state. Only upon closing the parallelogram suspension 100, i.e., such that the surfaces 124 and 126 can be aligned with one another, does the release 122 pop open (e.g., under spring pressure) and catch on the surface 126 of the second swing arm 104 such that the parallelogram suspension 100 is locked in the closed configuration.

Figure 5:
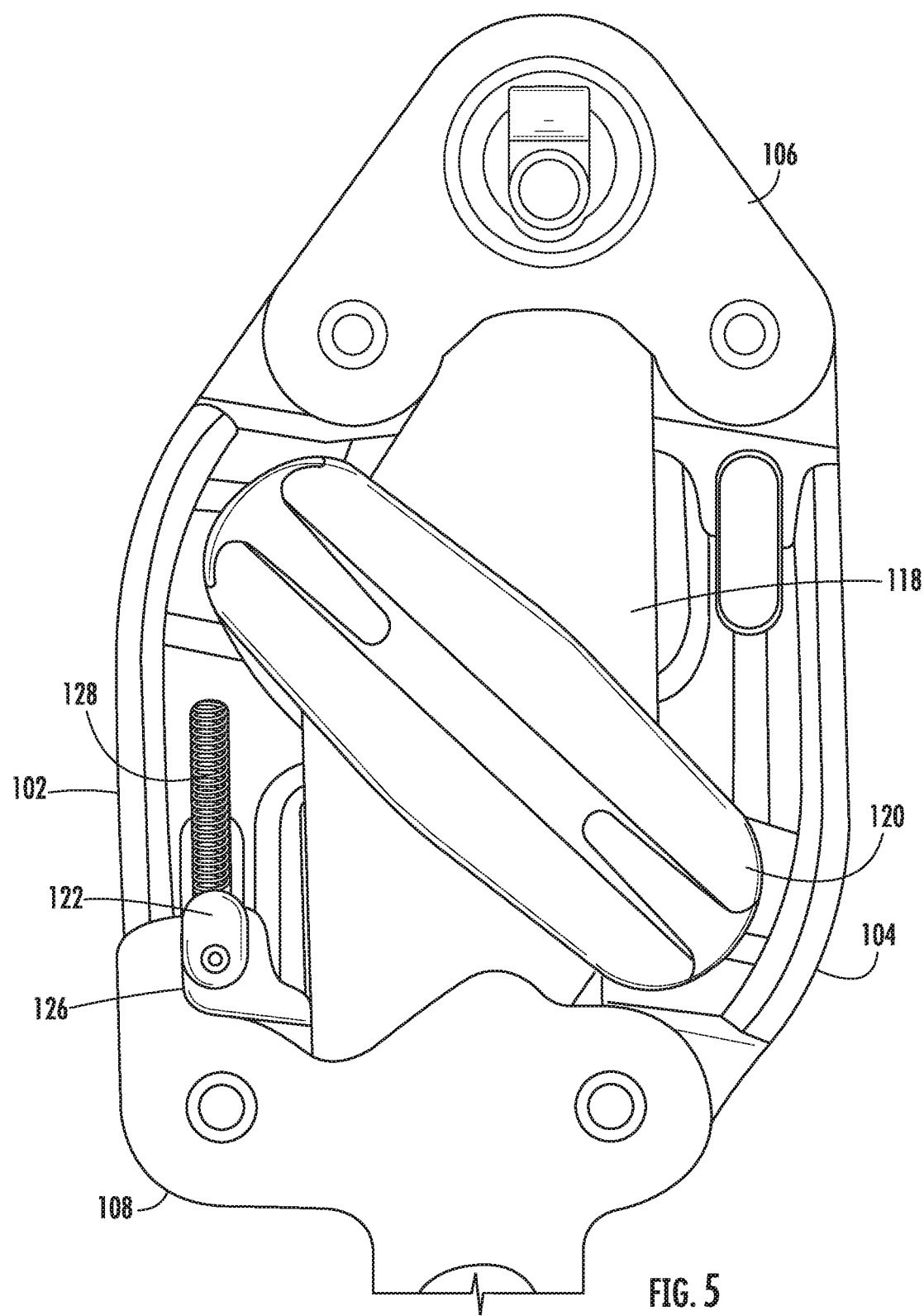
FIG. 5 includes a cross-sectional view of a bicycle suspension in a closed configuration in accordance with an embodiment of the present disclosure.

It should be understood that the release 122 can alternatively or additionally be disposed on the first swing arm 102, the linkage 106, and/or the seat post 108 and can interact with any other component of the parallelogram suspension 100 to selectively open the volume 118. For example, referring to FIG. 5, the release 122 may be disposed on the first swing arm 102 and interact with the surface 126 of the seat post 108. The release 122 may be slidable between a locked configuration (as shown) in which the effective dimension, DE, of the volume 118 maintains the deformable support 120 within the volume 118 and an unlocked configuration in which the deformable support 120 is removable from the volume 118.

In certain instances, the use of release 122 can mitigate the need for special tooling to open the volume 118. In this regard, the rider can swap, remove, or replace the deformable support 120 while riding without having to bring any tools. That is, the rider can open the parallelogram suspension 100 to permit replacement of the deformable support 120 without using any external tools, such as, for example, screw drivers, wedges or levers, wrenches, or the like. Instead, the rider can operate the switch 122 to open the volume 118.

In an embodiment, the volume 118 can open unassisted upon switching the release 122 to the open configuration. That is, for example, the deformable support 120 may create an internal pressure within the volume 118 which biases open the parallelogram support 100 when the release 122 is depressed. In another embodiment, the volume 118 can be manually opened by the rider after or during operation of the release 122. That is, the rider can manually rotate at least one of the first and second swing arms 102 or 104 after and/or during depression of the release 122.

By way of non-limiting example, the release 122 can include a dial, a knob, a lever, a slidable element, an interference pin, a bayonet connection, a threadable interface, a magnetically secured element, or the like. The release 122 may be disposed on a first element of the parallelogram suspension (e.g., the first side rail 102) and interact with a second element of the parallelogram suspension (e.g., the linkage 106) different than the first element. In an embodiment, the release 122 can include a safety (not illustrated) configured to maintain the release 122 in the closed configuration. The safety can include, for example, a cotter pin, a slidable interface configured to form an interference fit with the release 122, or another suitable safety element.

Figure 6:
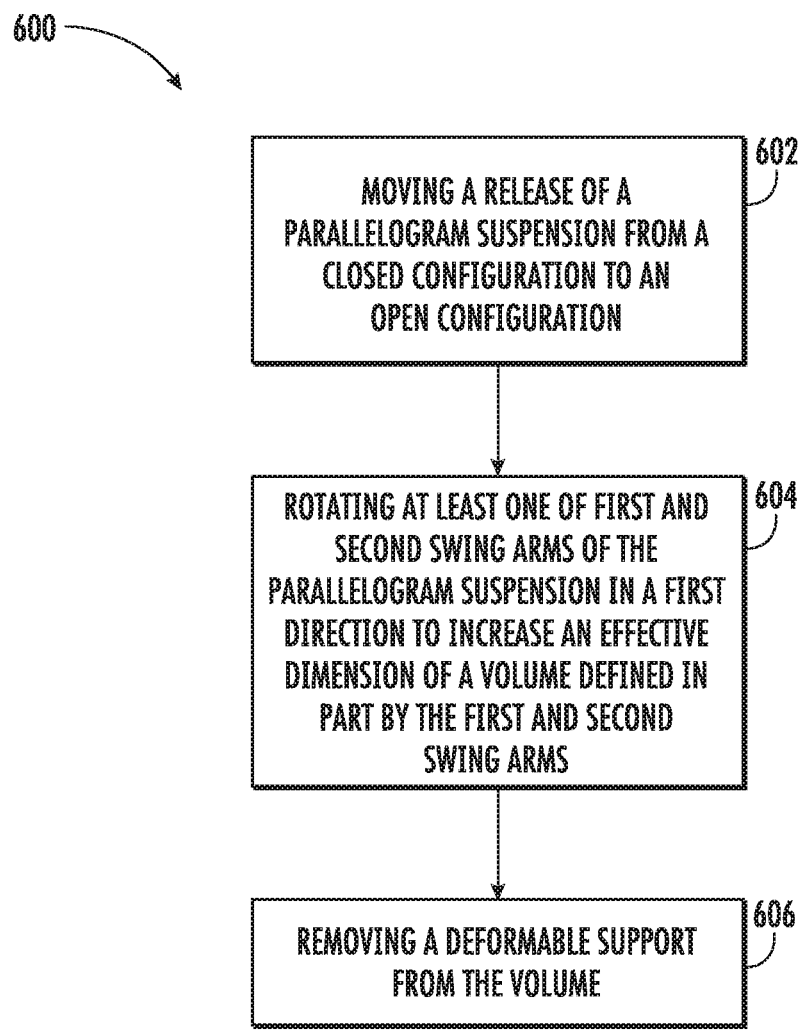
FIG. 6 includes a method of adjusting suspension stiffness for a bicycle in accordance with an embodiment of the present disclosure.

FIG. 6 shows a method 600 of adjusting a suspension stiffness for a bicycle. The method 600 includes a step 602 of moving a release of a parallelogram suspension from a closed configuration to an open configuration. The method 600 further includes a step 604 of rotating at least one of first and second swing arms of the parallelogram suspension in a first direction to increase an effective dimension of a volume defined in part by the first and second swing arms. The method further includes a step 606 of removing a deformable support from the volume.

In an embodiment, the method can further include installing a new deformable support into the volume after removing a previous deformable support. The method can additionally include a step of rotating the at least one of first and second swing arms in a second direction opposite the first direction to close the volume and secure the new deformable support within the volume.

In an embodiment, the method 600 can be performed without removing the parallelogram suspension from the bicycle. The method can also be performed without the use of separate tooling, such as screw drivers, wedges or levers, wrenches, or the like.

Parallelogram suspensions in accordance with one or more embodiments described herein may allow a rider or operator to more easily adjust a suspension characteristic of their bicycle without requiring the use of tools. The rider can open and close the parallelogram suspension by adjusting the position of a release disposed on the parallelogram suspension.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A parallelogram suspension in a bicycle, the parallelogram suspension comprising:
   a first swing arm rotatably coupled to a seat post at a first end of the first swing arm;
   a second swing arm rotatably coupled to the seat post at a first end of the second swing arm;
   a linkage rotatably coupled between a second end of the first swing arm and a second end of the second swing arm;
   a deformable support disposed in a volume defined between the first swing arm, the second swing arm, and the linkage; and
   a release configured to selectively open the volume to release the deformable support, wherein the release is configured to rotate to move between an open configuration and a closed configuration.

2. The parallelogram suspension of claim 1, wherein at least one of the first and second swing arms is configured to rotate in a first direction when acting in a shock absorbing capacity, and wherein the at least one of the first and second swing arms is configured to rotate in a second direction when being opened, and wherein the first direction is opposite the second direction.

3. The parallelogram suspension of claim 1, wherein the release is spring loaded to a closed configuration.

4. The parallelogram suspension of claim 1, wherein the release is configured to slide within a slot disposed in at least one of the first swing arm, the second swing arm, the linkage, and the seat post, and wherein the release is configured to form an engagement interface with another one of the first swing arm, the second swing arm, the linkage, and the seat post, the engagement interface being configured to selectively maintain the release in the closed configuration.

5. The parallelogram suspension of claim 1, wherein the release is configured to translate linearly within a slot of the parallelogram suspension to move between the open configuration and the closed configuration.

6. The parallelogram suspension of claim 1, wherein, in a closed configuration, the release is configured to form an interference fit with at least one of the first swing arm, the second swing arm, the linkage, and the seat post in the closed configuration that prevents the parallelogram suspension from moving to the open configuration.

7. The parallelogram suspension of claim 1, wherein an effective dimension of the volume becomes larger when the release is selectively moved to the open configuration, and wherein the deformable support is removable from the larger volume.

8. The parallelogram suspension of claim 1, wherein the deformable support is selected from a plurality of deformable supports and wherein the deformable support is configured to be changed between the plurality of deformable supports without the use of separate tooling.

9. The parallelogram suspension of claim 1, wherein the deformable support comprises an elastomeric body.

10. A parallelogram suspension in a bicycle comprising a deformable support configured to absorb shock, wherein the deformable support is selected from a plurality of deformable supports and wherein the deformable support is configured to be changed between the plurality of deformable supports without the use of separate tooling, wherein the parallelogram suspension comprises a spring-loaded release configured to selectively move between a closed and open configuration, and wherein the deformable support is removable from the parallelogram suspension when the release is in the open configuration.

11. The parallelogram suspension of claim 10, wherein the parallelogram suspension comprises a first swing arm and a second swing arm connected together at first ends by a linkage and at second ends by a seat post, wherein the parallelogram suspension is configured to absorb shock when at least one of the first and second swing arms rotates in a first direction, wherein the parallelogram suspension is configured to be opened to permit changing of the deformable support when the at least one of the first and second swing arms rotates in a second direction, and wherein the first direction is opposite the second direction.

12. A method of adjusting suspension stiffness for a bicycle, the method comprising:
rotating a release of a parallelogram suspension to move from a closed configuration to an open configuration;
rotating at least one of first and second swing arms of the parallelogram suspension in a first direction to increase an effective dimension of a volume defined in part by the first and second swing arms; and
removing a deformable support from the volume.

13. The method of claim 12, further comprising installing a new deformable support into the volume after removing a previous deformable support.

14. The method of claim 13, further comprising rotating the at least one of first and second swing arms in a second direction opposite the first direction to close the volume and secure the new deformable support within the volume.

15. The method of claim 14, wherein the release automatically locks the volume in the closed configuration when the at least one of first and second swing arms is in a closed position.

16. The method of claim 12, wherein the method is performed without removing the parallelogram suspension from the bicycle, and wherein the method is performed without the use of separate tooling.

17. The method of claim 12, wherein moving the release to the open configuration comprises moving the release away from an interference fit.

* * * * *